(12) United States Patent
Imamiya et al.

(10) Patent No.: US 9,475,379 B2
(45) Date of Patent: Oct. 25, 2016

(54) TIRE/WHEEL ASSEMBLY

(75) Inventors: Susumu Imamiya, Hiratsuka (JP); Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 315 days.

(21) Appl. No.: 14/003,426

(22) PCT Filed: Mar. 7, 2012

(86) PCT No.: PCT/JP2012/055880
§ 371 (c)(1),
(2), (4) Date: Sep. 5, 2013

(87) PCT Pub. No.: WO2012/121306
PCT Pub. Date: Sep. 13, 2012

(65) Prior Publication Data
US 2013/0342001 A1    Dec. 26, 2013

(30) Foreign Application Priority Data

Mar. 9, 2011   (JP) ................................. 2011-052150

(51) Int. Cl.
*B60K 7/00*  (2006.01)
*B60C 7/18*  (2006.01)
*B60B 9/04*  (2006.01)

(52) U.S. Cl.
CPC .............. *B60K 7/0007* (2013.01); *B60B 9/04* (2013.01); *B60C 7/18* (2013.01); *B60B 2900/513* (2013.01); *B60K 2007/0038* (2013.01); *B60K 2007/0092* (2013.01); *B60Y 2200/10* (2013.01)

(58) Field of Classification Search
CPC ..................... B60K 7/0007; B60K 2007/0038
USPC ..................................... 180/65.1–65.5; 152/5
See application file for complete search history.

(56) References Cited

U.S. PATENT DOCUMENTS

| 1,445,522 | A  |   | 2/1923  | Lytle |
|-----------|----|---|---------|-------|
| 4,241,960 | A  | * | 12/1980 | Hentschel ..................... 384/297 |
| 4,913,258 | A  |   | 4/1990  | Sakurai et al. |
| 7,261,782 | B2 | * | 8/2007  | Hwang et al. ............... 148/421 |
| 7,389,999 | B2 |   | 6/2008  | Kimura et al. |
| 7,832,509 | B2 | * | 11/2010 | Thomson et al. ......... 180/24.11 |
| 8,091,596 | B2 | * | 1/2012  | Louden ............................. 152/5 |
| 8,276,628 | B2 | * | 10/2012 | Hanada et al. ................. 152/34 |
| 8,646,497 | B2 | * | 2/2014  | Cron ............................... 152/80 |

(Continued)

FOREIGN PATENT DOCUMENTS

| DE | 60 2004 010 6 | 12/2008 |
| EP | 1 378 377 | 1/2004 |
| JP | 1-247218 | 10/1989 |
| JP | H05-104969 | 4/1993 |

(Continued)

OTHER PUBLICATIONS

International Search Report for PCT/JP2012/055880, May 10, 2012, 6 pages, Japan.

*Primary Examiner* — John Walters
*Assistant Examiner* — James Triggs
(74) *Attorney, Agent, or Firm* — Thorpe North & Western

(57) ABSTRACT

A tire/wheel assembly includes a cylindrical annular structure, a rubber material layer provided on a periphery of the annular structure and that faces a circumferential direction of the annular structure, and a plurality of curved metal spring members provided between the annular structure and an electric motor disposed on the inner side of the annular structure that transfers rotation of a rotor of the electric motor to the annular structure.

17 Claims, 9 Drawing Sheets

(56) References Cited

U.S. PATENT DOCUMENTS

| | | |
|---|---|---|
| 2002/0185209 A1 | 12/2002 | Leibowitz |
| 2004/0069385 A1 | 4/2004 | Timoney et al. |
| 2004/0099455 A1 | 5/2004 | Nagaya |
| 2008/0000706 A1 | 1/2008 | Tashiro et al. |
| 2009/0033051 A1 | 2/2009 | Ahnert |
| 2011/0108173 A1 | 5/2011 | Abe |
| 2011/0260521 A1 * | 10/2011 | Watkin et al. ............... 301/5.21 |

FOREIGN PATENT DOCUMENTS

| | | |
|---|---|---|
| JP | 2004-115014 | 4/2004 |
| JP | 2005-329909 | 12/2005 |
| JP | 2006-246678 | 9/2006 |
| JP | 2004-152416 | 5/2007 |
| JP | 2009-214611 | 9/2009 |
| JP | 2010-132259 | 6/2010 |
| WO | WO 02/083446 | 10/2002 |
| WO | WO 2002/100660 | 12/2002 |

\* cited by examiner

TIRE/WHEEL ASSEMBLY

TECHNICAL FIELD

The present technology relates to a tire/wheel assembly.

BACKGROUND ART

The use of electric motors together with a gasoline engine (hybrid vehicle) as well as a conversion to an electric motor (electric vehicle) is progressing as a countermeasure to global warming in order to reduce the amount of carbon dioxide generated from an automobile. When using an electric motor as a source to generate motive power in a vehicle, an in-wheel motor system is known in which an electric motor and braking device are assembled in a wheel space (see Japanese Unexamined Patent Application Publication No. 2004-152416A and Japanese Unexamined Patent Application Publication No. 2004-115014A). Further, because the structure of the in-wheel motor system arranges the electric motor in the interior of the wheel, heat generated by the electric motor easily builds up in the interior of the wheel. Therefore, a structure that allows the heat generated by the electric motor to easily dissipate is desired. Techniques, such as those described in Japanese Unexamined Patent Application Publication No. H05-104969A and Japanese Unexamined Patent Application Publication No. 2006-246678A, are known as techniques for improving heat dissipation in an in-wheel motor system. The in-wheel motor system contributes to the compactness of a vehicle because a significant area can be made available within the vehicle while eliminating power train components such as a drive shaft, differential gear, and the like. Further, the in-wheel motor system is garnering attention as an electric vehicle (EV) system of the future for the ease in drive control of the steering wheels and in manifesting a drive performance not available in conventional vehicles. For example, a vehicle that is equipped with in-wheel motors in either four wheels or in the left and right wheels can be expected to utilize the high responsivity, precision of the applied torque, and the reversible rotary characteristic of the electric motors to enable a high degree of vehicle attitude control and to exhibit high vehicle maneuverability.

SUMMARY

A vehicle that has the in-wheel motor system may have a decreased ground contact characteristic or riding comfort compared to a vehicle that has a motor in the vehicle body due to an increase in mass below the spring equivalent to the portion of the electric motor mounted in the wheel.

The vehicle that has the in-wheel motor system must transfer rotary torque variations to the road surface without delay in order to exhibit the high responsivity of the electric motor. On account of this, the vehicle having the in-wheel motor system requires high rigidity and low loss characteristics in the rotating direction in the tire/wheel assembly. Furthermore, the vehicle having the in-wheel motor system requires that the ground contact characteristic (friction) between the tire and the road surface be stable in the tire/wheel assembly.

Meanwhile, because the mass below the spring increases in the vehicle having the in-wheel motor system, the tire/wheel assembly is preferably made to be extremely lightweight. In addition to this, any degradation in the riding comfort must be reduced as much as possible without increasing the rigidity in the vertical direction more than necessary in the tire/wheel assembly.

The balance in the rigidity required in the tire/wheel assembly used in the vehicle having the in-wheel motor system has optimally uniform ground contact pressure while having a rigidity balance that has high responsiveness in the tire circumferential direction and appropriately low rigidity in the tire longitudinal direction. However, as for characteristics of a pneumatic tire, rigidity fluctuates depending on variance in the air pressure. Therefore, vertical rigidity, horizontal rigidity, and circumferential rigidity rise with an increase in air pressure without the ability to independently control vertical rigidity, horizontal rigidity, and circumferential rigidity, respectively. Further, the techniques disclosed in Japanese Unexamined Patent Application Publication No. H05-104969A and Japanese Unexamined Patent Application Publication No. 2006-246678A result in a large-scale device and are lacking in practical utility.

SUMMARY

The present technology provides a tire/wheel assembly suited to an in-wheel motor system that can ensure an appropriately low rigidity in the longitudinal direction and an appropriate ground contact area while also having excellent transfer of power in the circumferential direction.

A tire/wheel assembly includes a cylindrical annular structure, a rubber material layer provided on a periphery of the annular structure and that faces a circumferential direction of the annular structure, and a plurality of curved metal spring members provided between the annular structure and an electric motor disposed on the inner side of the annular structure that transfers rotation of a rotor of the electric motor to the annular structure.

A more preferred configuration of the assembly given above is to provide an inner side annular structure that is a cylindrical structure, disposed on the inner side of the annular structure and connecting the plurality of metal spring members, wherein the inner side annular structure is preferably connected to the rotor.

A more preferred configuration of the assembly given above is a configuration where a material of the annular structure is preferably stainless steel or steel having a thickness of not less than 0.2 mm and not more than 1.0 mm.

A more preferred configuration of the assembly given above is a configuration where a material of the annular structure is preferably stainless steel, steel, aluminum, or an aluminum alloy having a thickness greater than 1.0 mm and not more than 5.0 mm.

A more preferred configuration of the assembly given above is a configuration where a product of an elastic modulus and the thickness of the annular structure is preferably not less than 10 and not more than 500.

A more preferred configuration of the assembly given above is a configuration where a product of an elastic modulus and the thickness of the annular structure is preferably not less than 15 and not more than 400.

A more preferred configuration of the assembly given above is a configuration where a thickness of the metal spring members is preferably not less than 0.2 mm and not more than 0.6 mm.

A more preferred configuration of the assembly given above is a configuration where an elastic modulus of the metal spring members is preferably not less than 70 GPa and not more than 250 GPa.

A more preferred configuration of the assembly given above is a configuration where an elastic modulus of the metal spring members is preferably not less than 80 GPa and not more than 230 GPa.

A more preferred configuration of the assembly given above is a configuration where not less than 20 and not more than 120 of the metal spring members are arranged facing the circumferential direction of the annular structure.

A more preferred configuration of the assembly given above is a configuration where not less than 30 and not more than 90 of the metal spring members are arranged facing the circumferential direction of the annular structure.

The present technology provides a tire/wheel assembly suited to an in-wheel motor system that can ensure an appropriately low rigidity in the longitudinal direction and an appropriate ground contact area while also having excellent transfer of power in the circumferential direction.

DETAILED DESCRIPTION

Figure 1:
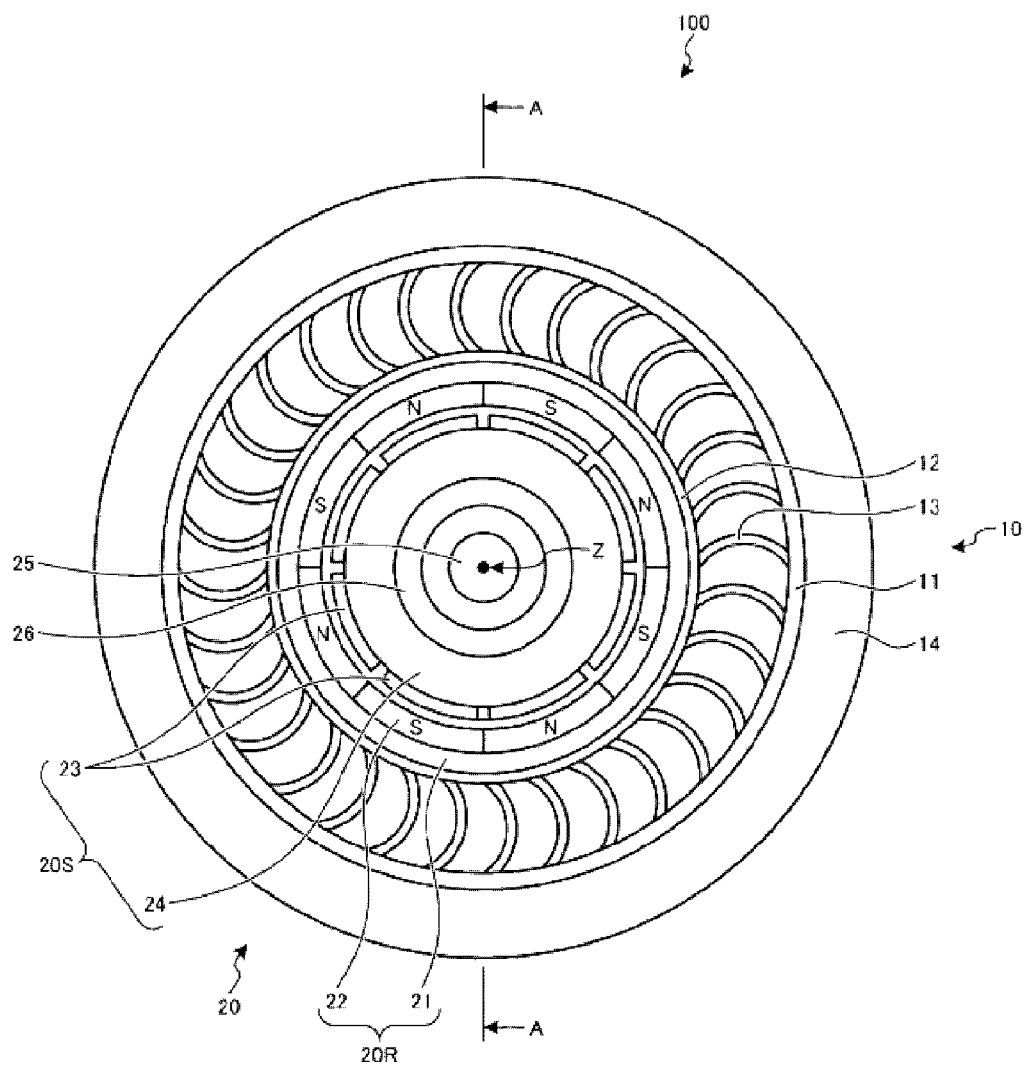
FIG. 1 is a front view of a tire/wheel assembly according to an embodiment of the present technology.

A form of the present technology (embodiment) is described below in detail while referring to the drawings. However, the present technology is not limited to the descriptions given in the embodiment. Additionally, the constituents described below include those constituents that could be easily conceived by a person skilled in the art, and constituents that are essentially identical to those described herein. Furthermore, it is possible to combine the constituents described below as desired.

Figure 2:
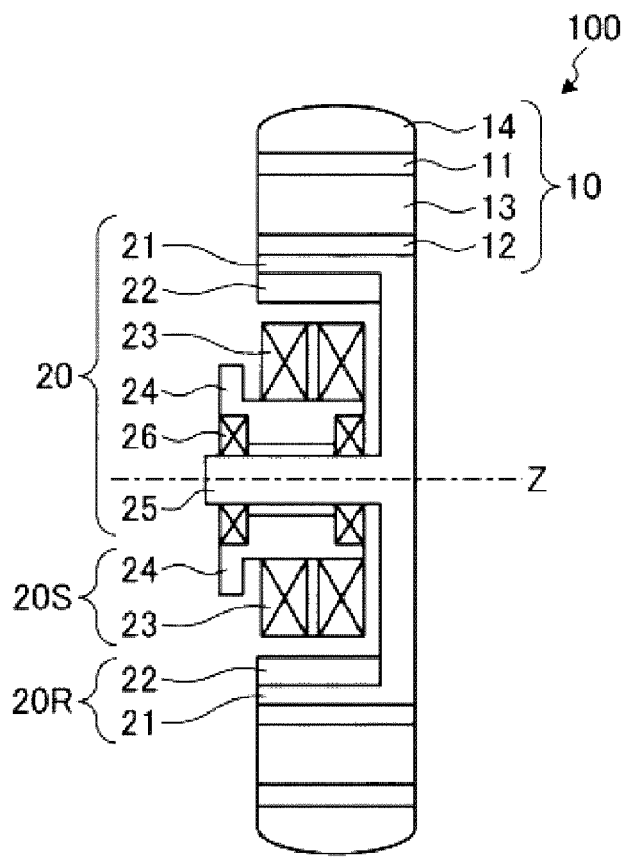
FIG. 2 is a cross-sectional view taken along A-A of FIG. 1.

FIG. 1 is a front view of a tire/wheel assembly according to an embodiment of the present technology. FIG. 2 is a cross-sectional view taken along A-A of FIG. 1. The tire/wheel assembly 10 is, for example, installed on an electric motor 20 and driven to run a vehicle. A vehicle running device 100 is configured by combining the tire/wheel assembly 10 with the electric motor 20. The tire/wheel assembly 10 includes an annular structure 11, a rubber material layer 14, and a metal spring members 13. In the embodiment, the tire/wheel assembly 10 further includes an inner side annular structure 12, however, this is not necessarily required.

The annular structure 11 is a cylindrical structure. The rubber material layer 14 is provided on a periphery of the annular structure 11 facing the circumferential direction of the annular structure 11 and cover the periphery of the annular structure 11. A top surface of the rubber material layer 14 becomes a tread surface that contacts the road surface. The metal spring members 13 are curved members. The metal spring members 13 are provided in a plurality between the annular structure 11 and the electric motor 20 disposed on the inner side of the annular structure 11 and transfer rotation of a rotor 20R of the electric motor 20 to the annular structure 11.

The inner side annular structure 12 is a cylindrical structure disposed on the inner side of the annular structure 11 and is made of a metal material similar to the annular structure 11. The inner side annular structure 12 connect the plurality of the metal spring members 13. Further, the inner side annular structure 12 is connected to the rotor 20R. When connecting the metal spring members 13 directly to the rotor 20R, the inner side annular structure 12 is not required.

The electric motor 20, as illustrated in FIG. 1 and FIG. 2, is an outer rotor type electric motor having the rotor 20R disposed on the outer side of a stator 20S. The electric motor 20 is installed in a suspension device of a vehicle and is used in the so-called in-wheel motor system. The rotor 20R includes a rotor case 21 having an annular structure and permanent magnets 22 that are installed on the inner circumference of the rotor case 21. The permanent magnets 22 are alternatingly disposed with the S pole and the N pole facing the circumferential direction of the rotor case 21. A shaft 25 is installed in the center portion of the rotor case 21.

The stator 20S is disposed on the inner side of the permanent magnets 22 that belong to the rotor 20R. The stator 20S has a plurality of coils 23 provided on a periphery of a stator main body 24. The stator main body 24 has an axle bearing 26 in the center portion. The shaft 25 described above is supported by the stator main body 24 via the axle bearing 26. According to this type of structure, the rotor 20R can rotate around the stator main body 24 on rotational axis Z. In the embodiment, because the tire/wheel assembly 10 is installed on the outer side of the rotor 20R via the inner side annular structure 12, the tire/wheel assembly 10 rotates together with the rotor 20R around the rotational axis Z of electric motor 20 when the rotor 20R of the electric motor 20 rotates.

Figure 3:
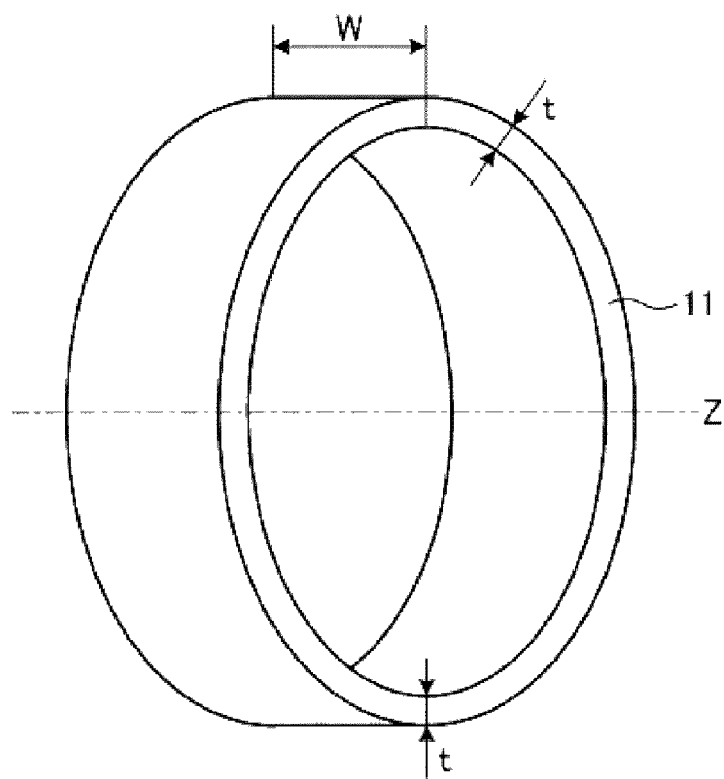
FIG. 3 is a perspective view of an annular structure.
Figure 4:
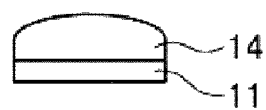
FIG. 4 is a cross-sectional view illustrating the annular structure and a rubber material layer.
Figure 5:
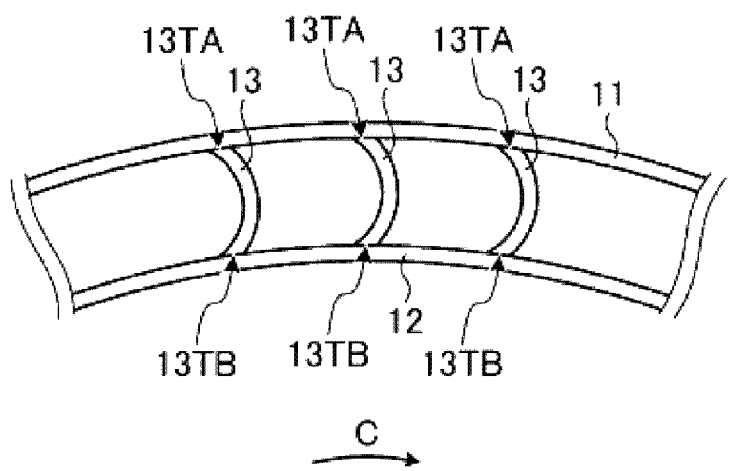
FIG. 5 is a partial side view illustrating the annular structure, an inner side annular structure, and metal spring members.

FIG. 3 is a perspective view of the annular structure. FIG. 4 is a cross-sectional view illustrating the annular structure and the rubber material layer. FIG. 5 is a partial side view illustrating the annular structure, the inner side annular structure, and the metal spring members. The annular structure 11, as illustrated in FIG. 3, has a constant width (a dimension in a parallel direction to the rotational axis Z of the annular structure 11) W facing the circumferential direction. In the embodiment, the annular structure 11 is made of a metal material such as steel, stainless steel, an aluminum alloy, or the like.

An elastic modulus of the annular structure 11 is preferably not less than 70 GPa and not more than 250 GPa. Further, a thickness t of the annular structure 11 is preferably set to be a suitable size depending on the material of the annular structure 11 and is within a range of not less than 0.1 mm and not more than 5.0 mm. A product of the elastic modulus and the thickness t of the annular structure 11 (referred to as the "rigidity parameter") is preferably not less than 10 and not more than 500, and more preferably not less than 15 and not more than 400. By configuring the rigidity parameter to be within the range described above, rigidity of the annular structure 11 in the meridian cross-section increases. As a result, when the rubber material layer 14 that makes up the tread portion of the tire/wheel assembly 10 makes ground contact with a road surface, deformations caused by the annular structure 11 in the meridian cross-section of the rubber material layer 14 (tread portion) are suppressed. Therefore, viscoelastic energy loss of the tire/wheel assembly 10 caused by the deformations is suppressed. Additionally, by configuring the rigidity parameter to be within the range described above, rigidity of the annular structure 11 in the radial direction decreases. As a result, the tread portion of the tire/wheel assembly 10 pliably deforms at a ground contact portion between the tire/wheel assembly 10 and the road surface, just as with conventional pneumatic tires. Due to such a function, the tire/wheel assembly 10 eccentrically deforms while localized concentrations of strain and stress in the ground contact portion are avoided and, therefore, strain in the ground contact portion can be dispersed. Therefore, localized deformation of the rubber material layer 14 in the ground contact portion is suppressed, resulting in an appropriate ground contact area of the tire/wheel assembly 10 being ensured and rolling resistance being reduced. Furthermore, keeping rigidity parameters within the range given above ensures pressure resistance performance while also ensuring durability against repeated bending.

Furthermore, with the tire/wheel assembly 10, because the in-plane meridian cross-section rigidity of the annular structure 11 is great and the ground contact area of the rubber material layer 14 is ensured, ground contact length in the circumferential direction can be ensured. Therefore, lateral forces, generated when a rudder angle is input, increase. As a result, the tire/wheel assembly 10 can obtain high cornering power.

When the thickness (a dimension in a radial direction to the annular structure 11) t of the annular structure 11 is not less than 0.2 mm and not more than 1.0 mm, stainless steel or steel may be used as the material for the annular structure 11. When the thickness (a dimension in a radial direction to the annular structure 11) t of the annular structure 11 is greater than 1.0 mm and not more than 5.0 mm, stainless steel, steel, or an aluminum alloy may be used as the material for the annular structure 11. Doing this allows the rigidity parameters to be easily set within the range described above.

The rubber material layer 14 illustrated in FIG. 4, as described above, becomes the tread portion of the tire/wheel assembly 10. Rubber material similar to that used in conventional pneumatic tires may be used as the rubber material layer 14. Although omitted in FIG. 4, it is preferred that the tread pattern be formed by providing a main groove or a lug groove on the top surface (outer circumferential surface) of the rubber material layer 14. Note that the rubber material layer 14 may be reinforced by metal fibers, organic fibers, or the like. The rubber material layer 14 and the annular structure 11 may be bonded by, for example, an adhesive.

As illustrated in FIG. 5, the metal spring members 13 are members having a cross-sectional arc shape. As material for the metal spring members 13, a metal material appropriate for a spring, such as steel, stainless steel, spring steel, or the like, may be used. Further, in the embodiment, the inner side annular structure 12 is made of a metal material such as steel, stainless steel, an aluminum alloy, or the like. The metal spring members 13, as described above, are arranged between the annular structure 11 and the inner side annular structure 12. In addition, a first end portion 13TA of the metal spring member 13 is fixed to an inner circumferential surface of the annular structure 11, and a second end portion 13TB is fixed to an outer circumferential surface of the inner side annular structure 12. According to this type of structure, the plurality of metal spring members 13 connect the annular structure 11 and the inner side annular structure 12.

The metal spring members 13, the annular structure 11, and the inner side annular structure 12 are preferably fixed by, for example, a set screw, welding, crimping, or the like. These can be securely fixed if fixed in this manner. Furthermore, an advantage to using a set screw is that the metal spring members 13, the annular structure 11, and the inner side annular structure 12 can be separated. In the case where an inner side annular structure 12 is not used, the metal spring members 13 can be directly attached to the rotor case 21 of the electric motor 20. Also in this case, both portions are fixed by a set screw, welding, crimping, or the like.

In the plurality of metal spring members 13, an area that corresponds to a curved section of the arc faces the circumferential direction (a direction illustrated by the arrow C in FIG. 5) of the annular structure 11 and the inner side annular structure 12, and an area that corresponds to a chord of the arc is nearly parallel to the radial direction of the annular structure 11 and the inner side annular structure 12. According to this type of structure, the bending of the metal spring members 13 allows the tire/wheel assembly 10 to absorb the force received from the road surface. In this manner, use of the metal spring members 13 enables the rigidity in the longitudinal direction to be appropriately low in the tire/wheel assembly 10.

The metal spring members 13 are arranged so that the length direction (a direction orthogonal to an edge surface of the arc shape) is nearly parallel to the width direction of the annular structure 11 and the inner side annular structure 12. The metal spring members 13 have high rigidity in the length direction while the rigidity is low in the direction that the area that corresponds to the chord of the arc expands and contracts. As a result, arranging the area that corresponds to the curved section of the arc of the metal spring members 13 to face the circumferential direction of the annular structure 11 and the inner side annular structure 12 allows the horizontal rigidity of the tire/wheel assembly 10 to be high and the vertical rigidity to be appropriately low.

The metal spring members 13 transfer forces between the annular structure 11 and the inner side annular structure 12. Specifically, the metal spring members 13 transfer a driving force from the electric motor 20 to the rubber material layer 14 via the annular structure 11, and transfer a braking force from the rubber material layer 14 to the electric motor 20 via the annular structure 11. Use of the metal spring members 13 in the tire/wheel assembly 10 improves the transfer efficiency of power in the circumferential direction between the annular structure 11 and the inner side annular structure 12. The width of the metal spring members 13 (a dimension in a parallel direction to the rotational axis Z of the annular structure 11) is an appropriate size that is not more than the width of the annular structure 11. Furthermore, the thickness of the metal spring members 13 is determined in consideration of the size of the motive power to be transferred between the electric motor 20 and the annular structure, the size of the impact to be absorbed by the metal spring members 13, the material of the metal spring members 13, and the like.

In addition, in the embodiment, the annular structure 11, the metal spring members 13, and the inner side annular structure 12 are all made of a metal material. Therefore, a structure is provided in which heat from the electric motor 20 is easily transferred thereto. Heat that occurs at the time that motive power is generated by the electric motor 20 is transferred to the metal spring members 13 via the inner side annular structure 12. The metal spring members 13 dissipate this heat into the air. Because the tire/wheel assembly 10 has a plurality of metal spring members 13, there can be a large heat dissipation area. Furthermore, the heat dissipation effect into the air is improved by the rotation of the metal spring members 13. In addition, because heat from the inner side annular structure 12 and the metal spring members 13 is also transferred to and dissipated from the annular structure 11, the tire/wheel assembly 10 can effectively dissipate heat from the electric motor 20.

In an in-wheel motor system, there is a tendency for heat generated by the electric motor to build up easily because the electric motor is disposed within the wheel. In the tire/wheel assembly 10, as described above, heat from the electric motor 20 can be effectively dissipated into the air by the plurality of metal spring members 13. On account of this, the tire/wheel assembly 10 is suited to an in-wheel motor system.

The thickness of the metal spring members 13 is preferably not less than 0.2 mm and not more than 0.6 mm. Further, the elastic modulus (Young's modulus) is preferably not less than 70 GPa and not more than 250 GPa. Not less than 80 GPa and not more than 230 GPa is more preferred. Preferably not less than 20 and not more than 120 metal spring members 13, and more preferably not less than 30 and not more than 90 metal spring members 13 are arranged facing the circumferential direction of the annular structure 10. If kept within this range, uniformity can be ensured and increases in mass and manufacturing cost can be suppressed.

Figure 6:
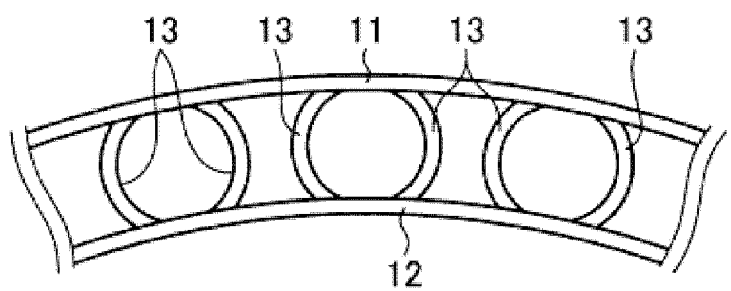
FIG. 6 is an explanatory view illustrating a modified example of an arrangement of the metal spring members.
Figure 7:
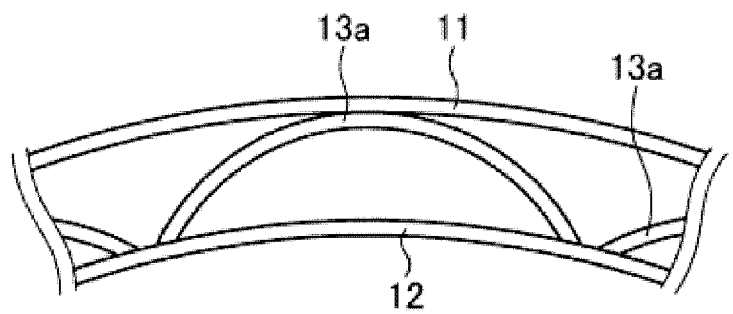
FIG. 7 is an explanatory view illustrating a modified example of an arrangement of the metal spring members.
Figure 8:
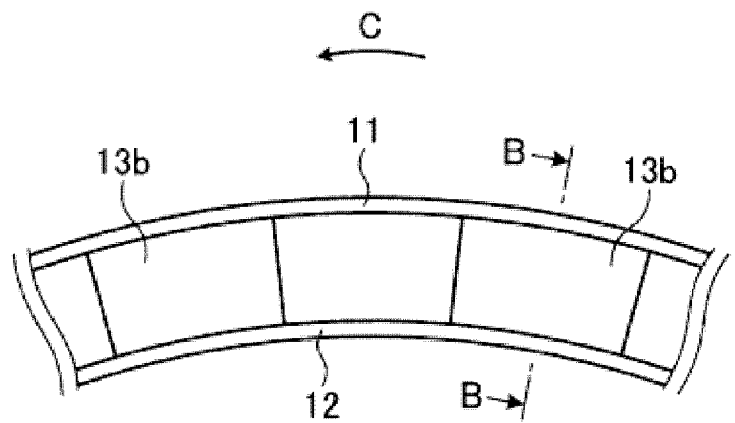
FIG. 8 is an explanatory view illustrating a modified example of an arrangement of the metal spring members.
Figure 9:
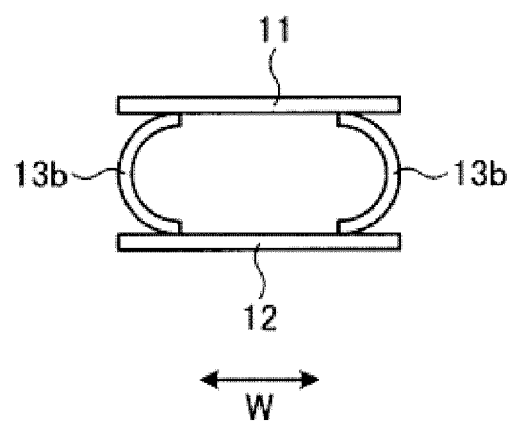
FIG. 9 is a cross-sectional view taken along B-B of FIG. 8.

FIGS. 6 to 8 are explanatory views illustrating modified examples of arrangements of the metal spring members. FIG. 9 is a cross-sectional view taken along B-B of FIG. 8. As illustrated in FIG. 6, the metal spring members 13 having a cross-sectional arc shape may be positioned so that convex sides of neighboring pairs of metal spring members 13 face each other. This configuration allows the number of metal spring members 13 that receive a tensile force to be equivalent to the number of metal spring members 13 that receive a compressing force when the metal spring members 13 transfer driving force from the electric motor 20 to the annular structure 11 and when the metal spring members 13 transfer the braking force from the rubber material layer 14 to the electric motor 20. Further, as illustrated in FIG. 7, both end portions of the metal spring member 13a having the cross-sectional arc shape may be fixed to the inner side annular structure 12 (illustrated in FIG. 1 or the rotor case 21 of the electric motor 20), and the outer side of the convex portion of the metal spring member 13a may be fixed to the annular structure 11.

The metal spring member 13b having the cross-sectional arc shape illustrated in FIG. 9 has a shape where the placement direction of the metal spring member 13 illustrated in FIG. 5 is rotated by 90°. Specifically, as illustrated in FIG. 9, in the metal spring member 13b, the area that corresponds to the curved section of the arc faces the width direction (the direction illustrated by the arrow W in FIG. 9) of the annular structure 11 and the inner side annular structure 12. In the example illustrated in FIG. 9, the metal spring member 12 is arranged so that the convex portion of the arc faces the outer side in the width direction, but the concave portion of the arc may be arranged to face the outer side in the width direction. By arranging the metal spring members 13b in this manner, the transfer efficiency of power in the circumferential direction (the direction illustrated by arrow C in FIG. 9) from the inner side annular structure 12 to annular structure 11 can be further improved. Furthermore, the metal spring members 13 have high rigidity in the length direction while the rigidity is low in the direction that the area that corresponds to the chord of the arc expands and contracts. As a result, use of the metal spring members 13 enables the rigidity in the longitudinal direction to be appropriately low in the tire/wheel assembly 10 illustrated in FIG. 1. Arranging the metal spring members 13b in this manner allows vertical rigidity in the tire/wheel assembly 10 illustrated in FIG. 1 to be relatively low and the transfer efficiency of power in the circumferential direction between the annular structure 11 and the inner side annular structure 12 to be high.

The vehicle running device 100 illustrated in FIG. 1 has an outer rotor type electric motor 20. An outer rotor type can achieve large angular moment and can thereby generate a large rotary drive torque because the point of electromagnetic action is separated away from the center of the rotation. Therefore, the outer rotor type does not require a reduction gear or the like between the electric motor 20 and the drive portion (rubber material layer 14) and can directly drive the drive portion. Thus, there is no time delay in power transfer and there is virtually no energy loss due to the power transfer of a reduction gear or the like in the outer rotor type, and therefore, the outer rotor type has a high energy transfer efficiency. However, the outer rotor type requires an outer rotor (rotor case 21) that has a large outer diameter with embedded permanent magnets which increases the mass of the electric motor 20 itself As a result, the outer rotor type increases the so-called mass below the spring that includes the electric motor, brake, hub, wheel, tire, and the like which may cause a reduction in the stability of the ground contact or in the riding comfort at the time of running on an uneven road surface. Because the tire/wheel assembly 10 of this embodiment arranges a rubber material layer 14 on the outer side in the radial direction of the annular structure 11, and because mass increase is suppressed, it is particularly suited to an outer rotor type in-wheel motor.

In the example, forces were transferred between the annular structure 11 and the inner side annular structure 12 by the metal spring members 13, 13a, and 13b, and the tire/wheel assembly 10 absorbed the forces received from the road surface. However, the absorbing of the forces is not limited to the metal spring members 13 and the like, and, for example, an air suspension chamber that uses a rubber material having a small deformation energy loss may be used.

Figure 10:
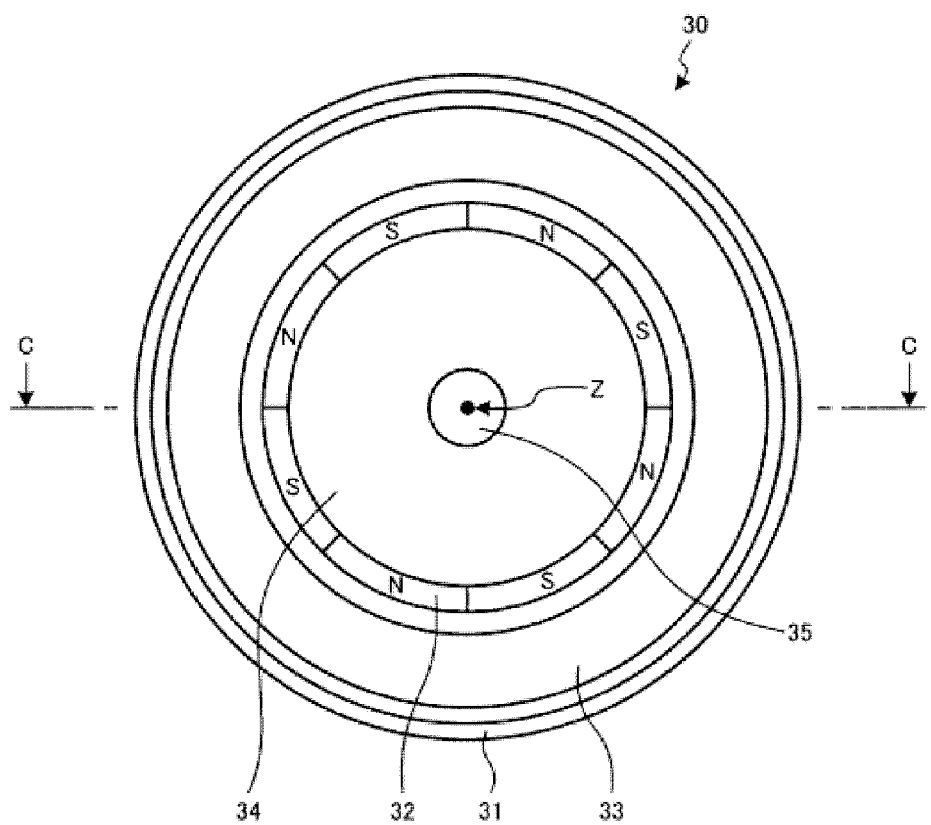
FIG. 10 is a side view illustrating an inner rotor type electric motor.
Figure 11:
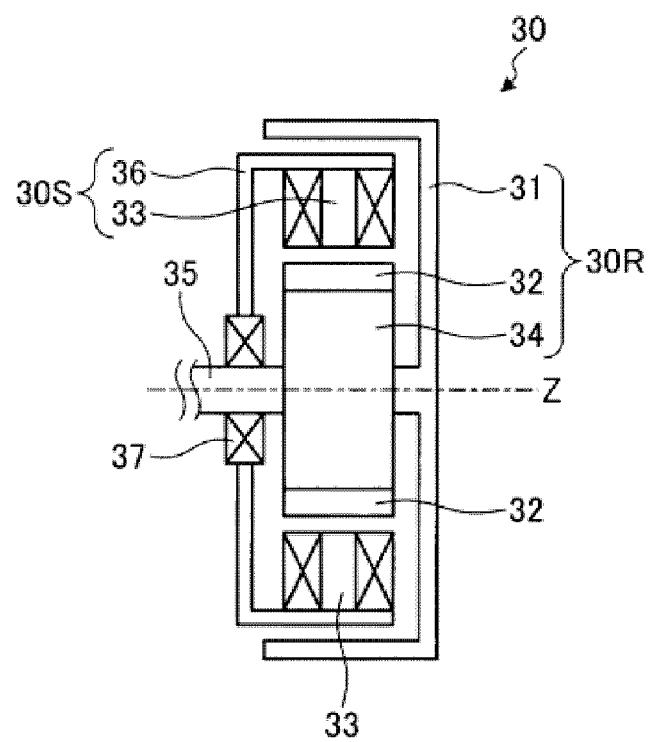
FIG. 11 is a cross-sectional view taken along C-C of FIG. 10.
Figure 12:
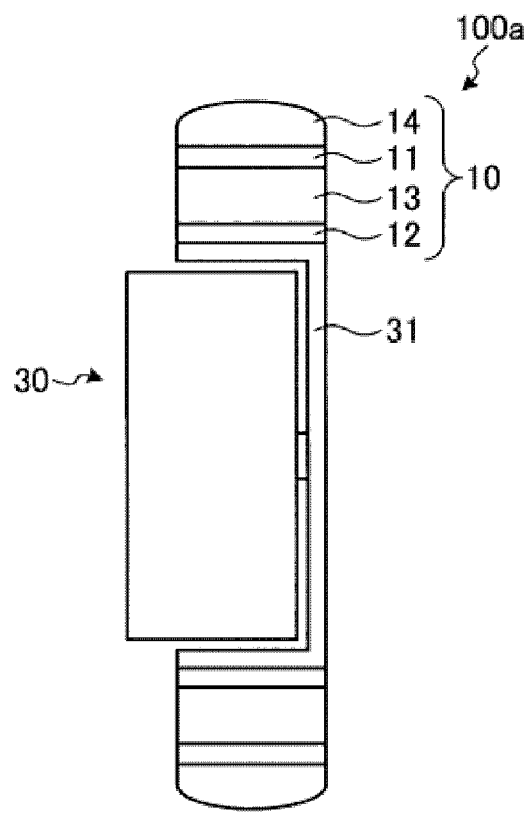
FIG. 12 is a cross-sectional view illustrating the tire/wheel assembly installed on the inner rotor type electric motor according to the embodiment.

FIG. 10 is a side view illustrating an inner rotor type electric motor. FIG. 11 is a cross-sectional view taken along C-C of FIG. 10. FIG. 12 is a cross-sectional view illustrating the tire/wheel assembly installed on the inner rotor type electric motor according to the embodiment. As illustrated in FIGS. 10 and 11, in the inner rotor type electric motor 30, rotor 30R is disposed on the inner side of a stator 30S. The electric motor 30 is installed in a suspension device of a vehicle and is used in the so-called in-wheel motor system. The rotor 30R includes a rotor main body 34 which is a cylindrical structure and permanent magnets 32 installed on a periphery of the rotor main body 34. The permanent magnets 32 are alternatingly disposed with the S pole and the N pole facing the circumferential direction of the rotor main body 34. A shaft 35 is installed in the center portion of the rotor main body 34. A rotor bracket 31 is connected to the shaft 35. The tire/wheel assembly 10 illustrated in FIG. 1 is affixed to the periphery of the rotor bracket 31.

The stator 30S is disposed on the outer side of the permanent magnets 22 that belong to the rotor 30R. The stator 30S has a plurality of coils 33 provided on an inner circumference of a stator main body 36. The stator main body 36 has an axle bearing 37 in the center portion. The shaft 35 described above is supported by the stator main body 36 via the axle bearing 37. According to this type of structure, the permanent magnets 32 of the rotor 30R and the rotor main body 34 can rotate around the inner side of the stator main body 36 on rotational axis Z. Note that the stator main body 36 is fixed to the vehicle.

A vehicle running device 100a is configured by combining the tire/wheel assembly 10 with the electric motor 20 as illustrated in FIG. 12. In this manner, the tire/wheel assembly 10 is installed to the outer side of the rotor bracket 31 of the rotor 30R via the inner side annular structure 12. As a result, the tire/wheel assembly 10 rotates together with the rotor 30R around the rotational axis Z of the electric motor 30 when the rotor 30R of the electric motor 30 rotates. In this manner, in the embodiment, the tire/wheel assembly 10 can be installed on either an outer rotor type electric motor or on an inner rotor type electric motor. The tire/wheel assembly 10 can effectively dissipate heat generated by the electric motor described above even when installed on an inner rotor type electric motor.

The tire/wheel assembly according to the embodiment described above connects the annular structure having a rubber material layer on the periphery to the rotor of an electric motor by a plurality of metal spring members having a cross-sectional arc shape. The tire/wheel assembly having this type of configuration is preferred because it can effectively dissipate heat generated by the electric motor into the air and heat dissipation is easily ensured even in a vehicle running device having an in-wheel motor system where heat from the electric motor easily builds up.

Furthermore, the tire/wheel assembly according to the embodiment described above can keep the overall mass relatively small because it uses a thin metal annular structure and a plurality of metal spring members. In addition, the tire/wheel assembly according to the embodiment can reduce rolling resistance by reducing the amount of rubber used and suppressing hysteresis loss. Furthermore, the tire/wheel assembly according to the embodiment can significantly reduce tire rolling resistance by using a metal material having energy loss due to deformation near zero in areas other than the area contacting the ground surface. As a result, a reduction in the amount of fuel consumption can be achieved.

Because the distance from center axis to the point of electromagnetic action is greater in an outer rotor type electric motor compared to an inner rotor type electric motor, a larger torque can be obtained by the same electrical power. Therefore, an outer rotor type electric motor is preferred for use in a vehicle running device having an in-wheel motor system. However, there is a tendency for mass to be larger in the outer rotor type due to the larger size in the outer diameter of the rotor and stator. The tire/wheel assembly of this embodiment can achieve an overall weight reduction because the annular structure, the metal spring members, and the inner side annular structure can be configured of relatively thin metal material. Therefore, an increase in the below spring mass can be suppressed even when an outer rotor type electric motor is used in a vehicle running device having an in-wheel motor system.

What is claimed is:

1. A tire/wheel assembly, comprising:
   a cylindrical annular structure;
   a rubber material layer provided on a periphery of the annular structure and that faces a circumferential direction of the annular structure; and
   a plurality of curved metal spring members provided between the annular structure and an electric motor disposed on the inner side of the annular structure that transfers rotation of a rotor of the electric motor to the annular structure, wherein
   an elastic modulus of the metal spring members is not less than 70 GPa and not more than 250 GPa; and
   a product of an elastic modulus and the thickness of the annular structure is not less than 10 kN/mm and not more than 500 kN/mm.

2. The tire/wheel assembly according to claim 1, further comprising:
   an inner side annular structure that is a cylindrical structure, disposed on the inner side of the annular structure and connecting the plurality of metal spring members, wherein
   the inner side annular structure is connected to the rotor.

3. The tire/wheel assembly according to claim 1, wherein a material of the annular structure is stainless steel or steel having a thickness of not less than 0.2 mm and not more than 1.0 mm.

4. The tire/wheel assembly according to claim 1, wherein a material of the annular structure is stainless steel, steel, aluminum, or an aluminum alloy having a thickness greater than 1.0 mm and not more than 5.0 mm.

5. The tire/wheel assembly according to claim 1, wherein a product of an elastic modulus and the thickness of the annular structure is not less than 15 kN/mm and not more than 400 kN/mm.

6. The tire/wheel assembly according to claim 1, wherein a thickness of the metal spring members is not less than 0.2 mm and not more than 0.6 mm.

7. The tire/wheel assembly according to claim 1, wherein an elastic modulus of the metal spring members is not less than 80 GPa and not more than 230 GPa.

8. The tire/wheel assembly according to claim 1, wherein not less than 20 and not more than 120 of the metal spring members are arranged facing the circumferential direction of the annular structure.

9. The tire/wheel assembly according to claim 1, wherein not less than 30 and not more than 90 of the metal spring members are arranged facing the circumferential direction of the annular structure.

10. The tire/wheel assembly according to claim 2, wherein a material of the annular structure is stainless steel or steel having a thickness of not less than 0.2 mm and not more than 1.0 mm.

11. The tire/wheel assembly according to claim 2, wherein a material of the annular structure is stainless steel, steel, aluminum, or an aluminum alloy having a thickness greater than 1.0 mm and not more than 5.0 mm.

12. The tire/wheel assembly according to claim 1, wherein a thickness of the metal spring members is not less than 0.2 mm and not more than 0.6 mm.

13. The tire/wheel assembly according to claim 5, wherein an elastic modulus of the metal spring members is not less than 80 GPa and not more than 230 GPa.

14. A tire/wheel assembly, comprising:
a cylindrical annular structure;
a rubber material layer provided on a periphery of the annular structure and that faces a circumferential direction of the annular structure; and
a plurality of curved metal spring members provided between the annular structure and an electric motor disposed on the inner side of the annular structure that transfers rotation of a rotor of the electric motor to the annular structure, wherein
the metal spring members have an arc-shaped curve,
one edge of the metal spring member is connected to the annular structure,
another edge of the metal spring member is connected toward the electric motor, and
a chord of the arc-shaped curve of the metal spring member is parallel with a radial direction of the annular structure.

15. A tire/wheel assembly according to claim 14, wherein convex portions of the arc-shaped curve of the metal spring members adjacent to each other face a same direction in the circumferential direction of the annular structure.

16. A tire/wheel assembly according to claim 14, wherein convex portions of the arc-shaped curve of the metal spring members adjacent to each other face an opposite direction in the circumferential direction of the annular structure.

17. A tire/wheel assembly, comprising:
a cylindrical annular structure;
a rubber material layer provided on a periphery of the annular structure and that faces a circumferential direction of the annular structure; and
a plurality of curved metal spring members provided between the annular structure and an electric motor disposed on the inner side of the annular structure that transfers rotation of a rotor of the electric motor to the annular structure, wherein
the metal spring members have an arc-shaped curve,
both edges of the metal spring member are connected toward the electric motor, and
a convex portion of the arc-shaped curve of the metal spring member is connected to the annular structure.

* * * * *